Sept. 9, 1969 R. V. POLE ET AL 3,466,110
LASER PROJECTOR FOR PHASE MODULATING OBJECTS
Filed March 24, 1966
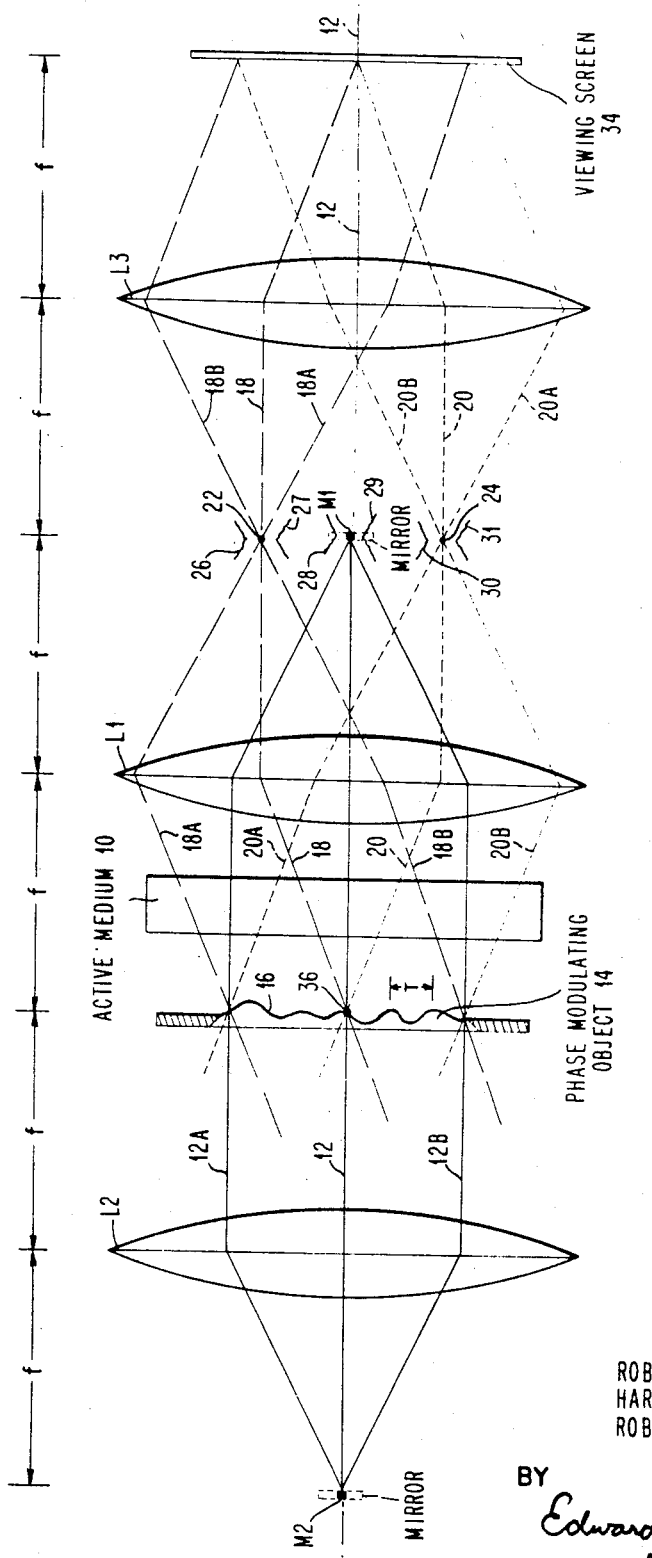
INVENTORS
ROBERT V. POLE
HAROLD WIEDER
ROBERT A. MYERS
BY
Edward G. Fiorito
ATTORNEY

United States Patent Office 3,466,110
Patented Sept. 9, 1969

3,466,110
LASER PROJECTOR FOR PHASE
MODULATING OBJECTS
Robert V. Pole, Yorktown Heights, Harold Wieder,
Mahopac, and Robert A. Myers, New York, N.Y., assignors to International Business Machines Corporation,
Armonk, N.Y., a corporation of New York
Filed Mar. 24, 1966, Ser. No. 537,147
Int. Cl. G02b 27/00
U.S. Cl. 350—3.5                          10 Claims

ABSTRACT OF THE DISCLOSURE

A laser cavity is provided which includes a phase modulating object and a laser medium for producing laser light. Two reflecting surfaces are arranged to form the ends of the cavity so that light which is unmodulated by the object, i.e., the zero order light, is reflected and contained within the cavity. At least a portion of a modulated light, typically first order light, is permitted to pass by one reflecting surface and is projected out of the cavity. The higher order light is collected by a lens and imaged on a viewing screen where the intensity of the light is a function of the phase modulating properties of the object. The zero order light, whose presence on the screen would obscure the information in the image, is stored within the cavity to provide energy and only the higher order light which produces the image is projected out of the cavity.

---

Typical phase modulating objects are transparent films having nonuniform thickness or indices of refraction, and reflectors having nonuniform surfaces. Such phase objects do not absorb or change the amplitude of light incident thereon, but instead change the phase of the incident light. Accordingly, little information about phase objects can be obtained with ordinary methods of observation. It is necessary to use special methods of observation, some of which are described in "Principals of Optics" by Born and Wolf, Pergamon Press (1959), p. 424. Most of these methods involve spatial filtering techniques requiring the absorption of certain spatial frequencies, particularly the zero and near-zero spatial frequencies. This produces energy losses and an attendant decrease in the effectiveness of the system.

It is an object of the present invention to provide an improved device for examining phase modulating objects.

It is another object of the present invention to provide an improved device for observing phase modulating objects with minimum losses.

Still another object of the present invention is to provide an improved device for projecting an image contained in a phase modulating object.

A further object of the present invention is to project a high intensity image out of a laser cavity.

It is another object of the present invention to provide an improved device for examining holograms.

These and other objects of the present invention are accomplished by providing a laser cavity having the phase modulating object contained therein. The reflecting surfaces of the cavity are arranged so that light which is unmodulated by the object (zero order light) is reflected and contained within the cavity, and at least a portion of the modulated light, typically the first order light, is permitted to pass by the reflecting surfaces and is projected out of the cavity.

The higher order light is collected and imaged on a viewing screen where the intensity of the light is a function of the phase modulating properties of the object. In this manner, the zero order light, whose presence on the screen would obscure the information in the image, is stored within the cavity and only the higher order light which produces the image is projected out of the cavity.

Another advantage of the present invention is the ability to examine holograms without the loss of zero order light.

The foregoing and other objects, features and advantages of the invention will be apparent from the following more particular description of a preferred embodiment of the invention, as illustrated in the accompanying drawing which is a diagram of an optical system embodying the present invention.

A laser cavity is formed between a pair of mirrors M1 and M2. The operation of the cavity is described first with the mirrors M1 and M2 limited to the size shown by the solid form in the drawing, and then with mirrors extended to the size illustrated by the broken line form. A pair of lenses L1 and L2, each of which may include more than one lens element, are arranged with coincident optic axes along a line 12. Mirrors M1 and M2 are placed perpendicular to line 12. The focal planes of lenses L1 and L2 are coincident with the reflecting faces of mirrors M1 and M2, and the two lenses are separated by the sum of their focal lengths. Therefore, light reflected by mirrors M1 and M2 passes through lenses L1 and L2 and emerges paralell to the optic axes as illustrated by lines 12A and 12B.

An active medium, as found in a typical laser, represented diagrammatically by block 10 is located anywhere between lenses L1 and L2. A pumping source (not shown) provides the inverted population within the active medium 10, and mirrors M1 and M2 set up oscillations along the path of line 12, thereby establishing a single mode of oscillation symmetrical about line 12. Line 12 is also the axis of symmetry of the cavity.

A phase modulating object 14, which may be a thermoplastic film having a ripple surface 16, is located in the center of the cavity and in the focal plane of both lenses L1 and L2. The ripple pattern of the surface 16 has a period T illustrated in the drawing as the distance between two peaks in the ripple pattern. The surface is greatly exaggerated in order to show the contours of the surface 16. The dominant pattern in the surface 16 is a sinusoidally varying waveform, called a carrier, and having the period T. Superimposed on the carrier are variations in amplitude which cause the surface 16 to deviate from the pure sinusoidal form. When light passes through phase modulating object 14, it is diffracted in a manner well known in the optics art and described in the text Born and Wolf above.

A considerable amount of light passing through object 14 is undiffracted, or unmodulated, and remains parallel to line 12. This light is referred to as the zero order, or central maximum which is focused on the mirrors M1 and M2. Due to the carrier wave in surface 16, other maxima occur in the plane of mirrors M1 and M2. To illustrate this, another group of rays 18 and 20 are shown in the drawing. The rays 18, 18A and 18B represent a group of parallel rays deflected upward by the phase modulating object 14 and focused by lens L1 at a point 22. Rays 20, 20A and 20B are focused in a similar manner at a point 24. High concentrations of light appear at points 22 and 24, and are referred to as the first order maxima. The location of the first orders can be moved away from the zero order by decreasing the period, or increasing the frequency of the carrier wave in surface 16.

If no deviations are superimposed on the carrier frequency in surface 16, the light in the plane of mirror M1 is focused by lens L1 into a single point on mirror M1, single points, at 22 and 24, and a number of higher order positions further away from M1 (not shown).

However, due to the deviations of surface 16 from a purely sinusoidal ripple, the zero order, first order maxima 22 and 24, as well as the higher order maxima are spread into a wider distribution of energy. The width of each distribution is dependent upon the number of different frequency components contained in the ripple surface 16. To illustrate this distribution, a group of lines 26–31 are shown. An analogy exists between the light spread about each maximum, and the sidebands about the carrier frequency and its harmonics in a communication system. Since the laser cavity is symmetrical another zero order, and higher order maxima are formed in the plane of mirror M2. However, in the embodiment shown in the drawing, only the light projected past mirror M1 is utilized.

Another lens L3 is located on the optic axis along line 12 and arranged to collect the higher order beams 22 and 24 and project them onto a viewing screen 34. Mirror M1 is located in the focal plane of lens L3, and viewing screen 34 is located in the other focal plane of lens L3. Therefore, rays diverging from maxima 22 and 24, represented by rays 18 and 20, are converted into parallel rays and projected onto viewing screen 34. In this manner, an image of the object 14 is reconstructed on viewing screen 34 but without the rays 12 which are returned by the mirror M1. Due to the absence of rays 12, light of varying intensity appears on screen 34, the intensity being a function of the phase modulating properties of object 14. If viewing screen 34 is a frosted glass plate an observer may focus his eyes upon the viewing screen 34 and observe an image corresponding to the modulation of the ripple pattern on surface 16.

If phase modulating object 14 is a hologram formed by the well-known technique of wavefront interference, then one may observe the pattern contained in the hologram by viewing the image on screen 34. In this case, the observer does not focus upon the plane including screen 34, but focuses upon the space behind the screen 34 thereby observing the pattern in three dimensions.

The intensity of the image projected on screen 34 can often be increased by increasing the size of mirrors M1 and M2 as shown by the broken lines. This permits a number of modes of oscillation such as the one represented by lines 12 to be set up within the cavity, and also allows oscillation at many different frequencies within the natural width of the laser transition. Each mode is slightly rotated about a center point 36 of the cavity, and produces the same ray patterns as illustrated by lines 12, 18 and 20. A number of first orders such as 22 and 24 are produced by this modification, and the spread about each order is wider than that illustrated by lines 26–31. Lens L3 remains the same, collecting the light from all first (and higher, when desired) order maxima and projecting it onto viewing screen 34 with greater intensity than the single mode illustrated in the drawing. The extension of mirrors M1 and M2 is limited by the spread of the first order maxima. That is, mirror M1 should not reach lines 27 or 30 to avoid reflecting this light back into the cavity.

Mirrors M1 and M2 should not be extended when examining a holographic phase modulating object 14. The hologram should be illuminated with a coherent wavefront emanating from a small point source such as the portion of mirrors M1 and M2 illustrated in solid form. If mirrors M1 and M2 are extended, the holographic image viewed through screen 34 would appear fuzzy, or shadowy.

Another modification to the cavity can be made where the surface 16 is silvered and therefore reflective. In this case, lens L2 and miror M2 can be eliminated. Lenses L1 and L3, mirror M1, viewing screen 34 and active medium 10 remain the same, and achieve the same resulting operation.

Although the phase modulating object 14 is shown to have a ripple surface 16, other phase modulating objects may be employed, such as those having a uniform thickness and an index of refraction which varies according to the location within the object 14. Whether the light is diffracted by the nonuniform width transparency 14 shown in the drawing, or whether it is reflected by a silvered rippled surface 16, or whether the light is refracted by a nonuniform index of refraction, light is deflected off axis 12 and projected out of the cavity resulting in the formation of an image on viewing screen 34 in the same manner as described in the illustrative embodiment.

The present invention can also be employed where the phase modulating object 14 has no dominant periodic, or carrier frequency. In this case, no first order, or higher order maxima are established. Only the zero order, or central maximum is established, with an intensity spread about the central maxima as illustrated by lines 28 and 29. By making mirror M1 sufficiently small so that only the undeflected light focused to a point on line 12 is returned to the cavity, and the modulated light spread out to lines 28 and 29 are permitted to pass by mirror M1, an image may be formed on viewing screen 34 by lens L3.

A further modification of the present invention can be made by eliminating lens L1 and moving mirror further away from object 14. Mirror M1 may be extended in size to approximately the same length as object 14. By moving mirror M1 a sufficient distance from object 14, the first order maxima 22 and 24 represented by parallel rays 18 and 20 can be projected above and below, respectively, the ends of mirror M1 and imaged by a suitable lens (not shown) upon a viewing screen.

Various other laser cavity geometries could be employed, such as those shown in Ser. No. 377,957, "Laser Beam Switching" by Robert V. Pole, Robert A. Myers, Euval S. Barrekette and Jaen Nunez, filed June 25, 1964; Ser. No. 413,704, "Laser Emission Control Apparatus" by Robert V. Pole, filed Nov. 25, 1964; and Ser. No. 511,841, "Laser Scanning Device" by Robert V. Pole, filed Dec. 6, 1965. Another geometry in which the present invention may be employed is the ring laser resonator. Also, the frequency of the light emitted from the laser 10 need not be in the visible frequency range, but may be radiation of any frequency.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A laser projector comprising:
   a resonant laser cavity including first and second reflective means positioned opposite each other to form the ends of said cavity, and an active laser medium located between said first and second reflective means for producing laser light in said cavity and lens means for focusing said laser light onto said first reflective means,
   a phase modulating object located in said cavity in the path of said laser light for deflecting a portion of said laser light out of said cavity, said lens means also functioning to form the optical Fourier transform of said phase modulating object,
   said first reflective means disposed substantially at the location of said optical Fourier transform and being limited in size to function as a spatial filter to permit the deflected portion of said light to be projected out of said cavity and to further function to reflect the undeflected portion of said light back into said cavity to enhance lasing in said cavity.

2. A laser projector according to claim 1 wherein said phase modulating object modules said laser light into zero order and higher order light and wherein said first reflective means is limited in size to function as a spatial filter to permit said higher order light to be projected out of said cavity and to reflect said zero order light back into said cavity to enhance lasing in said cavity.

3. A laser projector according to claim 1 wherein the rays of said laser light in said cavity are parallel to each other for a given length and wherein said phase modulating means is located in the path of said parallel rays.

4. A laser projector according to claim 1 further including a lens means located outside said cavity in the path of said deflected potrion of said light for collecting said deflected light for forming an image of said object.

5. A laser projector comprising:
  a resonant laser cavity including first and second mirrors positioned opposite each other to form the ends of said cavity and an active laser medium located between said first and second mirrors for producing laser light in said cavity,
  at least one lens located in said cavity spaced by its focal length from said first mirror,
  a phase modulating object located in said cavity in the path of said laser light and disposed in the focal plane of said lens on the side of said lens opposite said first mirror for deflecting a portion of said laser light out of said cavity,
  said first mirror being limited in size to function as a spatial filter to permit said deflected light to be projected out of said cavity and to reflect the undeflected portion of said light back into said cavity to enhance lasing in said cavity,
  and a lens means located outside of said cavity spaced by its focal length from said first mirror for collecting said deflected light projected from said cavity for forming an image of said object.

6. A laser projector according to claim 5 wherein said phase object contains a dominant carrier frequency for modulating said laser light in said cavity into a zero order maximum light and at least one first order maximum light, and wherein said first mirror is limited in size to reflect said zero order maximum light and to permit said first order maximum light to be projected out of said cavity.

7. A laser projector according to claim 5 wherein said phase object is a hologram and wherein said first mirror is limited in size to produce a single mode of laser oscillation in said cavity to illuminate said hologram with substantially coherent light.

8. A laser projector comprising:

a laser cavity including first and second afocally spaced lenses, first and second plane mirrors opposite each other to form the ends of said laser cavity, said first and second mirrors being located respectively in the front and rear focal planes of said first and second lenses, and an active laser medium located between said first and second mirrors for producing laser light in said cavity, a phase modulating object located in the focal plane intermediate said first and second lenses in the path of said laser light for deflecting a portion of said laser light, said first mirror being limited in size to function as a spatial filter to permit said deflected portion of said laser light to be projected out of said cavity and to reflect the undeflected portion of said light back into said cavity to enhance lasing in said cavity, a third lens means located outside said cavity spaced by its focal length from said first mirror for collecting said deflected light projected from said cavity for forming an image of said object.

9. A laser projector according to claim 8 wherein said phase modulating object contains a dominant carrier frequency modulating said laser light in said cavity into zero order light and at least one first order light, and wherein said first mirror reflects said zero order light and permits said first order light to be projected from said cavity.

10. A laser projector according to claim 8 wherein said phase modulating means is a hologram and said first mirror is limited in size to produce a single mode of oscillation in said cavity for illuminating said hologram with substantially coherent light.

References Cited

UNITED STATES PATENTS

| 3,297,876 | 1/1967 | De Maria | 331—94.5 |
| 3,327,243 | 6/1967 | Stickley | 331—94.5 |
| 3,353,115 | 11/1967 | Maiman | 331—94.5 |

DAVID SCHONBERG, Primary Eraminer

RONALD J. STERN, Assistant Examiner

U.S. Cl. X.R.

331—94.5; 350—162; 353—122

PO-1050
(5/69)

UNITED STATES PATENT OFFICE
CERTIFICATE OF CORRECTION

Patent No. 3,466,110         Dated September 9, 1969

Inventor(s)  R. V. Pole, H. Wieder, R. A. Myers

It is certified that error appears in the above-identified patent and that said Letters Patent are hereby corrected as shown below:

In the Claims, Column 4, Claim 2, line 73, delete "modules" and insert --modulates--. In Claim 4, Column 5, line 10, delete "potrion" and insert --portion--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents